May 6, 1958   F. H. MAY ET AL   2,833,623
RECOVERY OF BORIC ACID FROM TRIMETHYL BORATE
Filed Nov. 26, 1954
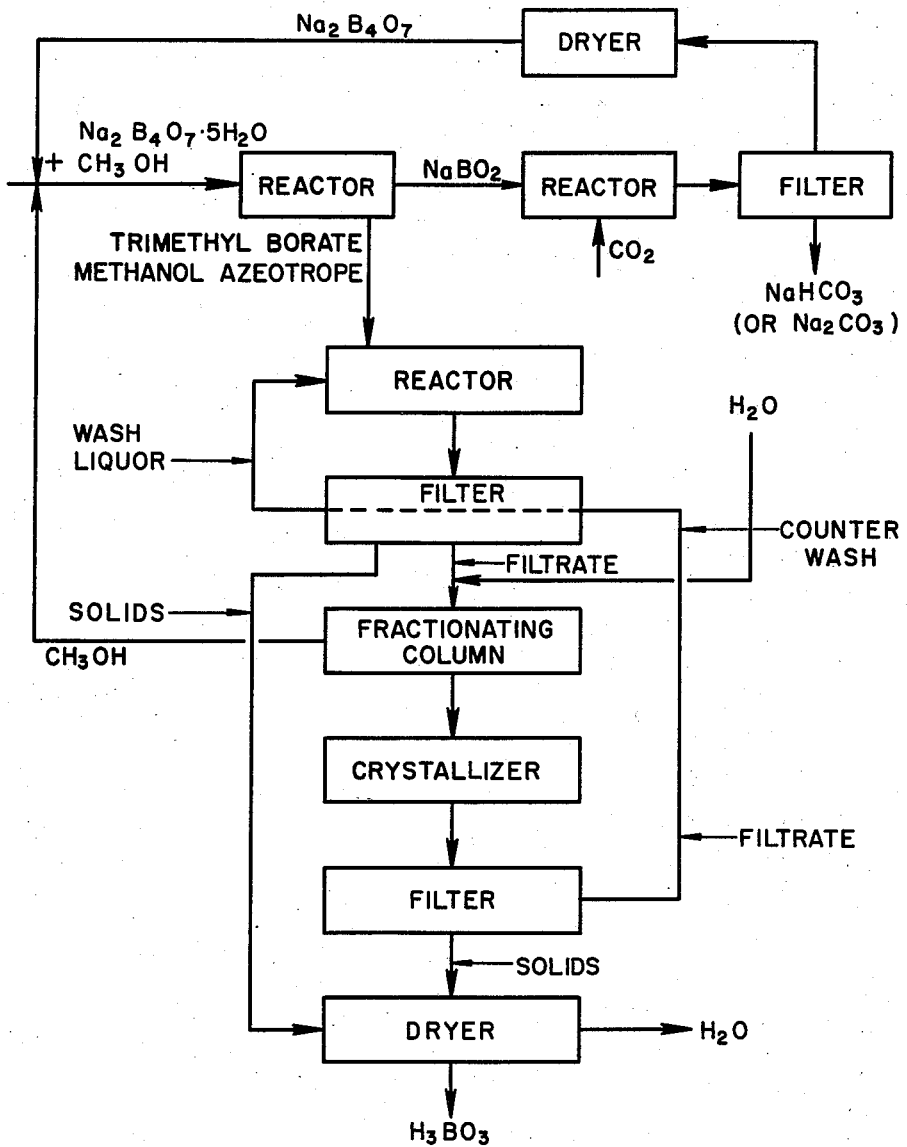
Frank H. May
Vladimir V. Levasheff
Howard N. Hammar
INVENTORS
BY Neal J. Mosely
their Attorney

United States Patent Office 2,833,623
Patented May 6, 1958

2,833,623
RECOVERY OF BORIC ACID FROM TRIMETHYL BORATE

Frank H. May, Vladimir V. Levasheff, and Howard N. Hammar, Whittier, Calif., assignors to Callery Chemical Company, Pittsburgh, Pa., a corporation of Pennsylvania Application November 26, 1954, Serial No. 471,173

9 Claims. (Cl. 23—149)

This invention relates to the recovery of boric acid from trimethyl borate and more particularly to a new and improved process for recovering boric acid from trimethyl borate by controlled hydrolysis.

Boric acid ($H_3BO_3$) is made commercially by treating a concentrated alkali metal borate such as borax ($Na_2B_4O_7$) with a mineral acid followed by recrystallization from water. Trimethyl borate can be prepared by various methods such as the reaction of boric oxide or boric acid with excess methanol or the reaction of a borate salt with a strong acid and methanol. In the pending application of May entitled, "Production of Boric Acid Esters," Ser. No. 471,172, filed November 26, 1954, a cyclic process is described for producing trimethyl borate by the reaction of an acid borate ore, such as sodium tetraborate, and methanol without additional acidification. We have now discovered that that process can be expanded into a cyclic process for producing boric acid by a controlled hydrolysis of the trimethyl borate to form boric acid and methanol and recycling the methanol to react with more sodium tetraborate or equivalent acid borate ore to form trimethyl borate.

It is an object of this invention to provide a new and improved process for the recovery of boric acid from trimethyl borate. Another object is to provide a new and improved process whereby trimethyl borate is hydrolyzed under proper conditions to form boric acid and methanol. A still further object is to provide a cyclic process in which the methanol formed is recirculated to react with sodium tetraborate to produce more trimethyl borate. Other objects will become apparent from the specification and claims which follow.

This new and improved process will be described more completely in the specification and the novelty thereof will be particularly pointed out and distinctly claimed.

In the accompanying drawing there is shown a flow diagram illustrating this process.

This invention is based upon the discovery that boric acid may be recovered in exceptionally good yield by a controlled hydrolysis of trimethyl borate. While the process described herein is generally operative for the recovery of boric acid from trimethyl borate it is obvious that this process would not be commercially practicable where the trimethyl borate was made from boric acid or boric oxide in the first instance. This process is therefore intended to be used primarily for recovering boric acid from trimethyl borate which has been prepared from a natural borate ore such as borax or colemanite in accordance with the co-pending application of May entitled, "Production of Boric Acid Esters," Ser. No. 471,-172, filed November 26, 1954. In its broadest aspect therefore this application relates to the recovery of boric acid from trimethyl borate but is particularly adapted for use with the May process and when so used constitutes a complete cyclic process for the preparation of boric acid from a naturally occurring ore such as borax or colemanite. In the May process for preparing trimethyl borate, borax is reacted with methanol as follows:

$$2Na_2B_4O_7 + 12CH_3OH \rightarrow 4B(OCH_3)_3 + 4NaBO_2 + 6H_2O$$

The sodium metaborate which is formed as a by-product of the foregoing reaction is converted to sodium tetraborate and sodium carbonate by reaction with carbon dioxide as follows:

$$4NaBO_2 + CO_2 \rightarrow Na_2B_4O_7 + Na_2CO_3$$

Taking the two steps of the May process together the overall reaction for the conversion of borax to trimethyl borate may be expressed as follows:

$$Na_2B_4O_7 + 12CH_3OH + CO_2 \rightarrow$$
$$4B(OCH_3)_3 + Na_2CO_3 + 6H_2O$$

In the present process trimethyl borate is hydrolyzed to produce boric acid and methanol as follows:

$$4B(OCH_3)_3 + 12H_2O \rightarrow 4H_3BO_3 + 12CH_3OH$$

In operating this process as a complete cyclic process for the preparation of boric acid the methanol which is formed in the hydrolysis of the trimethyl borate is recirculated to the reactor in which the trimethyl borate is prepared from borax. Combining the two steps of the May process with the hydrolysis step of this process it appears that the overall equation for the preparation of boric acid from borax by this process is:

$$Na_2B_4O_7 + CO_2 + 6H_2O \rightarrow Na_2CO_3 + 4H_3BO_3$$

This process is therefore operable to produce boric acid from borax without the use of a strong mineral acid.

In the hydrolysis of trimethyl borate it is possible merely to add water to the trimethyl borate and hydrolyze it to boric acid and methanol. If the hydrolysis is carried out in this manner however it will result in a mixture of water and methanol and boric acid from which the water and methanol must be separated in order to recover the boric acid. We have found that by carrying out this process in a series of steps which will be subsequently described we can avoid the necessity of separating the water from the boric acid which is formed and obtain substantially quantitative yields of solid crystalline boric acid. In order to test the steps which we proposed to embody in this process it was necessary that we have data as to the solubility of boric acid in various mixtures of water and methanol. These data were not available in the literature and were determined experimentally as follows:

| Wt. Percent $CH_3OH/H_2O$ | Grams Boric Acid/100 grams Solution | | | | |
|---|---|---|---|---|---|
| | 25° C. | 30° C. | 35° C. | 40° C. | 45° C. |
| 100/0 | 21.5 | 22.6 | 23.7 | 24.9 | 26.1 |
| 80/20 | 11.7 | 12.9 | 14.3 | 15.8 | 17.3 |
| 70/30 | 9.1 | 10.4 | 11.8 | 13.1 | 14.5 |
| 50/50 | 7.1 | 8.2 | 9.3 | 10.2 | 11.1 |
| 30/70 | 5.8 | 7.0 | 8.0 | 8.9 | 9.8 |
| 10/90 | 5.2 | 6.3 | 7.2 | 8.1 | 9.0 |
| 0/100 | 5.5 | 6.3 | 7.0 | 8.0 | 9.1 |

The above table clearly shows that at any desired temperature boric acid is substantially more soluble in methanol than in water. It is thus apparent that solutions which contain greater percentages of water will result in the precipitation of larger quantities of boric acid.

In carrying out this process we have found that there are two essential conditions which are required to obtain good yields. First of all the hydrolysis reaction must be carried out with a substantial stoichiometric excess of of water present to prevent a reversal of the reaction and a loss of methyl borate when the methanol is distilled from the reaction mixture. Secondly, the reaction should be carried out with a substantially saturated solution of boric acid in water so that the boric acid which is formed in the hydrolysis reaction will crystallize out of the solution. In applying these principles to this hydrolysis reaction the trimethyl borate is introduced into a reactor as the trimethyl borate-methanol azeotrope which is distilled from the borax-methanol reactor and thus avoiding the necessity for separating the trimethyl borate from the azeotrope. A substantially saturated solution of boric acid in water is added in a substantial stoichiometric excess to the trimethyl borate-methanol azeotrope in the reactor. The addition of this aqueous solution results in the formation of methanol and boric acid. Due to the fact that a substantially saturated solution of boric acid is used in carrying out the hydrolysis most of the boric acid which is produced in the hydrolysis reaction separates from the solution as solid crystals. The slurry which results from the hydrolysis reaction is passed to a filter in which the boric acid crystals are removed and a filtrate consisting of water, methanol, and a small amount of boric acid is removed from the filter. The filtrate from the foregoing filtration step is fed along with a stoichiometric amount of make-up water to a fractionating tower for recovery of methanol. In the fractionating tower the methanol which is produced by hydrolysis together with the methanol in the azeotrope is distilled overhead and recycled to the reactor in which the trimethyl borate was originally made. The bottoms from the fractionation tower consist of a hot, saturated solution of boric acid in water. The solution from the fractionating tower is passed to a crystallizer in which the solution is cooled and more of the boric acid is crystallized out and recovered. The slurry from the crystallizer is passed through another filter in which the boric acid crystals are recovered. The boric acid crystals from this last named filter together with the boric acid crystals recovered in the first filtration step are passed to a dryer and excess water removed therefrom. The filtrate from the last filtration step which consists of cool saturated solution of boric acid and water is passed counter-currently through the boric acid crystals recovered in the first filtration step. Because of the fact that this filtrate is saturated with boric acid this solution upon passing through the boric acid crystals from the first filtration step will not remove any of the boric acid but will wash out any residual methanol on those crystals. The aqueous solution of boric acid after passing countercurrently through the filter is then passed into the hydrolysis reactor to provide all of the water necessary for the hydrolysis reaction. This concentrated aqueous solution of boric acid provides the excess water necessary to carry out a complete hydrolysis reaction and to insure that most of the boric acid produced in the reaction is recovered as solid crystals.

In testing this process experimentally it was found that a quantitative recovery of boric acid and methanol can be had when the process is carried out as described. It was also found that to obtain the maximum benefits of the water used in the process the water necessary to hydrolyze the trimethyl borate should be added to the process along with the filtrate from the first filtration step as part of the feed to the distillation tower. It has been found from empirical studies of the water concentration in the tower feed that the mol fraction of water in the feed must be about 0.7 or more in order to prevent the loss of trimethyl borate with the methanol overhead from the distillation tower.

It is to be understood that while there has been described only one specific embodiment of this invention that within the scope of the claims appended hereto this invention may be practiced otherwise than as specifically described.

Having thus described out invention fully and completely what we desire to claim and secure by Letters Patent of the United States is:

1. A process of preparing boric acid comprising fractionating a mixture of borax and methanol in a distillation column, recovering trimethyl borate-methanol azeotrope as the overhead product from the column, recovering $NaBO_2$ as the bottom product from said column, reacting said $NaBO_2$ with $CO_2$ to produce $Na_2CO_3$ and $Na_2B_4O_7$, recycling the $Na_2B_4O_7$ to the first reaction step, hydrolyzing the trimethyl borate-methanol azeotrope with a substantial stoichiometric excess of water to produce boric acid and methanol, distilling off and recycling the methanol to the first reaction step, and recovering the boric acid.

2. A method according to claim 1 in which the hydrolysis step is carried out with a saturated solution of boric acid in water to insure a substantially complete precipitation of the boric acid produced in the hydrolysis reaction.

3. A method according to claim 2 in which the boric acid which crystallizes out during the hydrolysis reaction is filtered out before distilling off the methanol.

4. A method according to claim 3 in which the water required for the hydrolysis reaction is added to the filtrate before distilling off the methanol, and the aqueous solution of boric acid left after distilling off the methanol is recycled to hydrolyze more of the trimethyl borate.

5. A method according to claim 4 in which sufficient water is added to the filtrate to provide a mol fraction of at least 0.7 of water in the solution from which the methanol is distilled.

6. A method of preparing boric acid comprising hydrolyzing trimethyl borate with a substantial stoichiometric excess of a saturated aqueous solution of boric acid recycled from a subsequent step, filtering out the boric acid which precipitates during hydrolysis, adding make-up water to the filtrate, distilling off methanol from the filtrate, crystallizing more boric acid from the distillation residue, filtering boric acid from said distillation residue, collecting and drying boric acid from the filters, recycling the filtrate from the last filtration to wash residual methanol from boric acid crystals in the first filtration step, and further recycling said last named filtrate to the hydrolysis reactor to provide said saturated solution for hydrolyzing the the trimethyl borate.

7. A method according to claim 6 in which sufficient make-up water is added to provide a mol fraction of water of at least 0.7 in the solution from which the methanol is distilled.

8. A method of preparing boric acid from a mixture of trimethyl borate and methanol comprising hydrolyzing trimethyl borate contained in such a mixture with a substantial stoichiometric excess of a saturated aqueous solution of boric acid, recovering the boric acid that precipitates during hydrolysis, distilling off methanol from the hydrolysis mixture that has been freed of precipitated boric acid, crystallizing boric acid from the residue of said distillation, and recovering the crystallized boric acid.

9. A method according to claim 8 in which said mixture being hydrolyzed is trimethyl borate-methanol azeotrope.

References Cited in the file of this patent

UNITED STATES PATENTS

| | | |
|---|---|---|
| 725,786 | Smethurst | Apr. 21, 1903 |
| 1,308,577 | Calvert et al. | July 1, 1919 |
| 1,492,920 | Knight | May 6, 1924 |

OTHER REFERENCES

Perry: "Chemical Engineers Handbook," 3rd ed., pp. 1054–1061, McGraw-Hill Book Co., Inc. (1950).